No. 766,675. PATENTED AUG. 2, 1904.
J. C. DONNELLY.
MACHINE FOR MAKING BOX TRAYS.
APPLICATION FILED JAN. 27, 1902.
NO MODEL. 8 SHEETS—SHEET 1.

WITNESSES:
INVENTOR
Joseph C. Donnelly
BY John R. Nolan
ATTORNEY

No. 766,675. PATENTED AUG. 2, 1904.
J. C. DONNELLY.
MACHINE FOR MAKING BOX TRAYS.
APPLICATION FILED JAN. 27, 1902.
NO MODEL. 8 SHEETS—SHEET 5.

WITNESSES:
A. V. Groupe
S. Nolan

INVENTOR
Joseph C. Donnelly
By John R. Nolan
ATTORNEY

No. 766,675. PATENTED AUG. 2, 1904.
J. C. DONNELLY.
MACHINE FOR MAKING BOX TRAYS.
APPLICATION FILED JAN. 27, 1902.
NO MODEL. 8 SHEETS—SHEET 6.
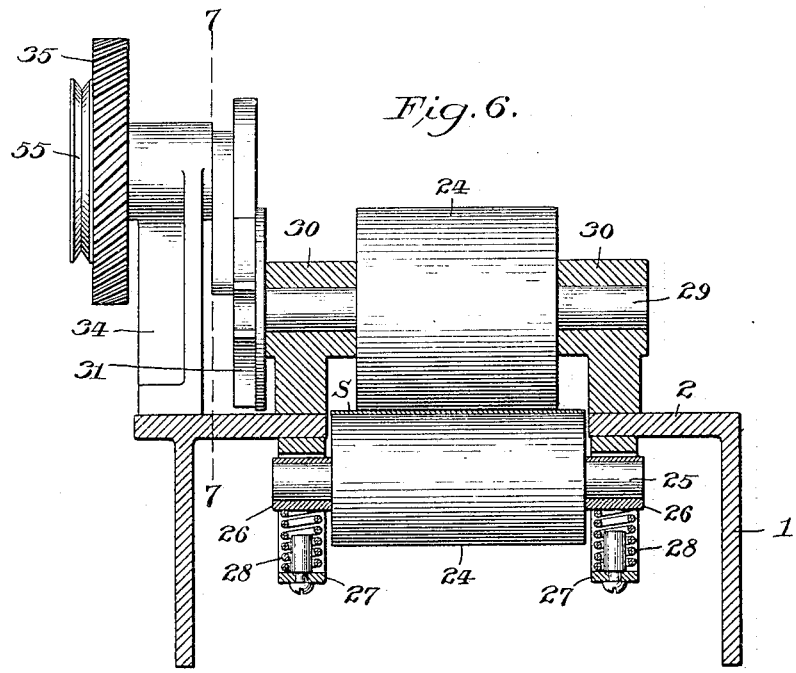
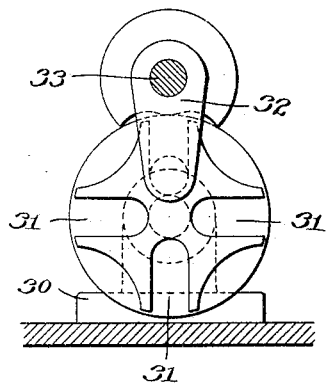
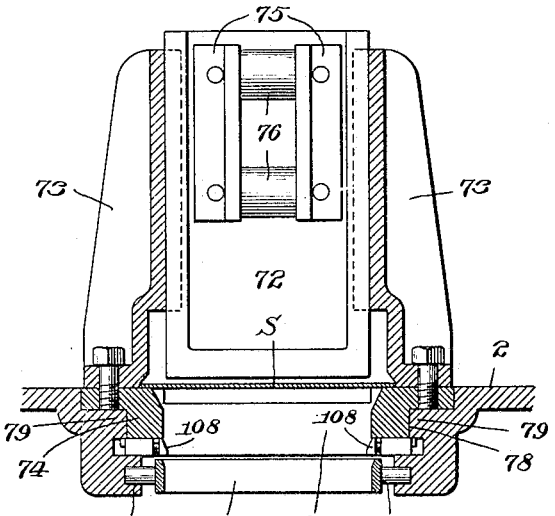
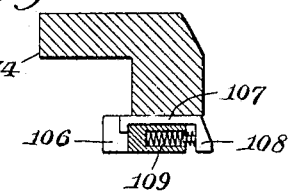
WITNESSES:
A. V. Groupy
S. Nolan
INVENTOR
Joseph C. Donnelly
BY John F. Nolan
ATTORNEY No. 766,675. PATENTED AUG. 2, 1904.
J. C. DONNELLY.
MACHINE FOR MAKING BOX TRAYS.
APPLICATION FILED JAN. 27, 1902.
NO MODEL. 8 SHEETS—SHEET 7.

WITNESSES:
A. V. Groupy
S. Nolan

INVENTOR
Joseph C. Donnelly
BY John R. Nolan
ATTORNEY

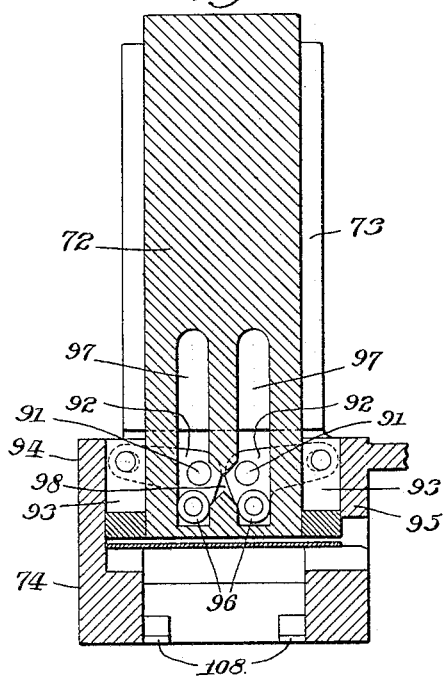
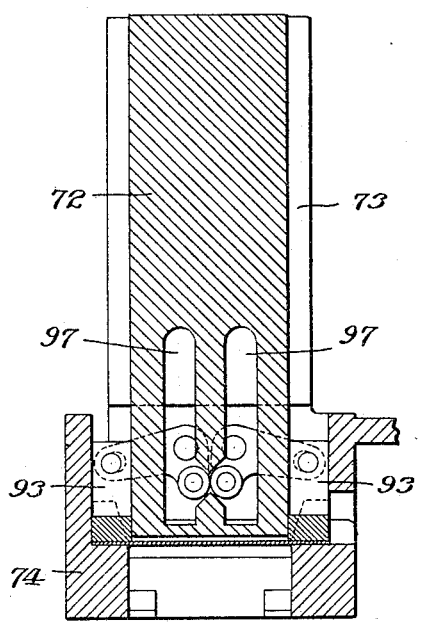
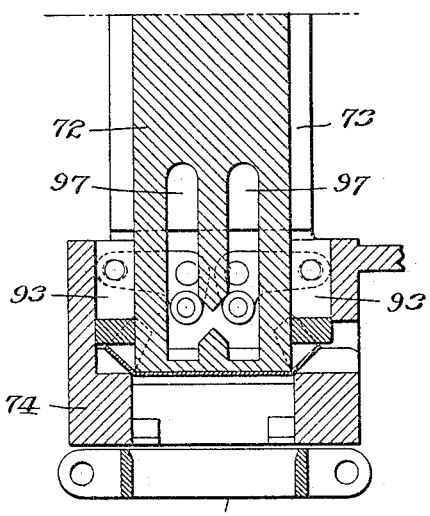
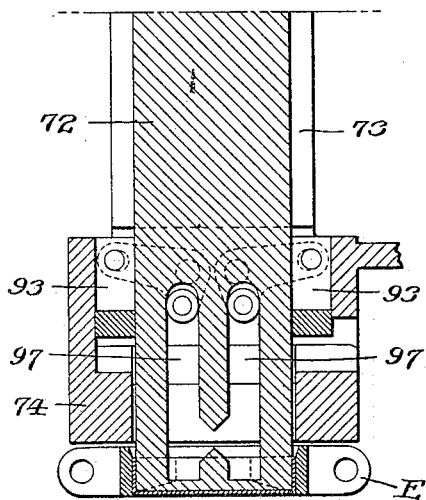
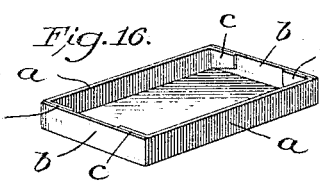

No. 766,675. Patented August 2, 1904.

UNITED STATES PATENT OFFICE.

JOSEPH C. DONNELLY, OF PHILADELPHIA, PENNSYLVANIA, ASSIGNOR TO THE DIAMOND MATCH COMPANY, OF NEW YORK, N. Y., A CORPORATION OF ILLINOIS.

MACHINE FOR MAKING BOX-TRAYS.

SPECIFICATION forming part of Letters Patent No. 766,675, dated August 2, 1904.

Application filed January 27, 1902. Serial No. 91,358. (No model.)

*To all whom it may concern:*

Be it known that I, JOSEPH C. DONNELLY, a citizen of the United States, residing in the city and county of Philadelphia and State of Pennsylvania, have invented certain new and useful Improvements in Machines for Making Box-Trays, of which the following is a full, clear, and exact description, reference being had to the accompanying drawings, forming a part of this specification.

This invention relates to that class of box-making machines which accomplish in continuous succession the operations of applying glue to a strip of strawboard or other suitable material, appropriately notching the edges of the strip, severing the strip into blanks of prescribed length, forming such blanks into trays, supporting the trays thus formed until the glued parts thereof have dried or set, and finally delivering the finished product.

The object of my invention is to improve the construction and operation of such machines with the view more especially of increasing the working speed of the machine and the quantity of trays produced thereby in a given time. To this end the invention comprises various novel features of construction and combinations and organizations of mechanism, which will be hereinafter described and claimed.

Figure 1:
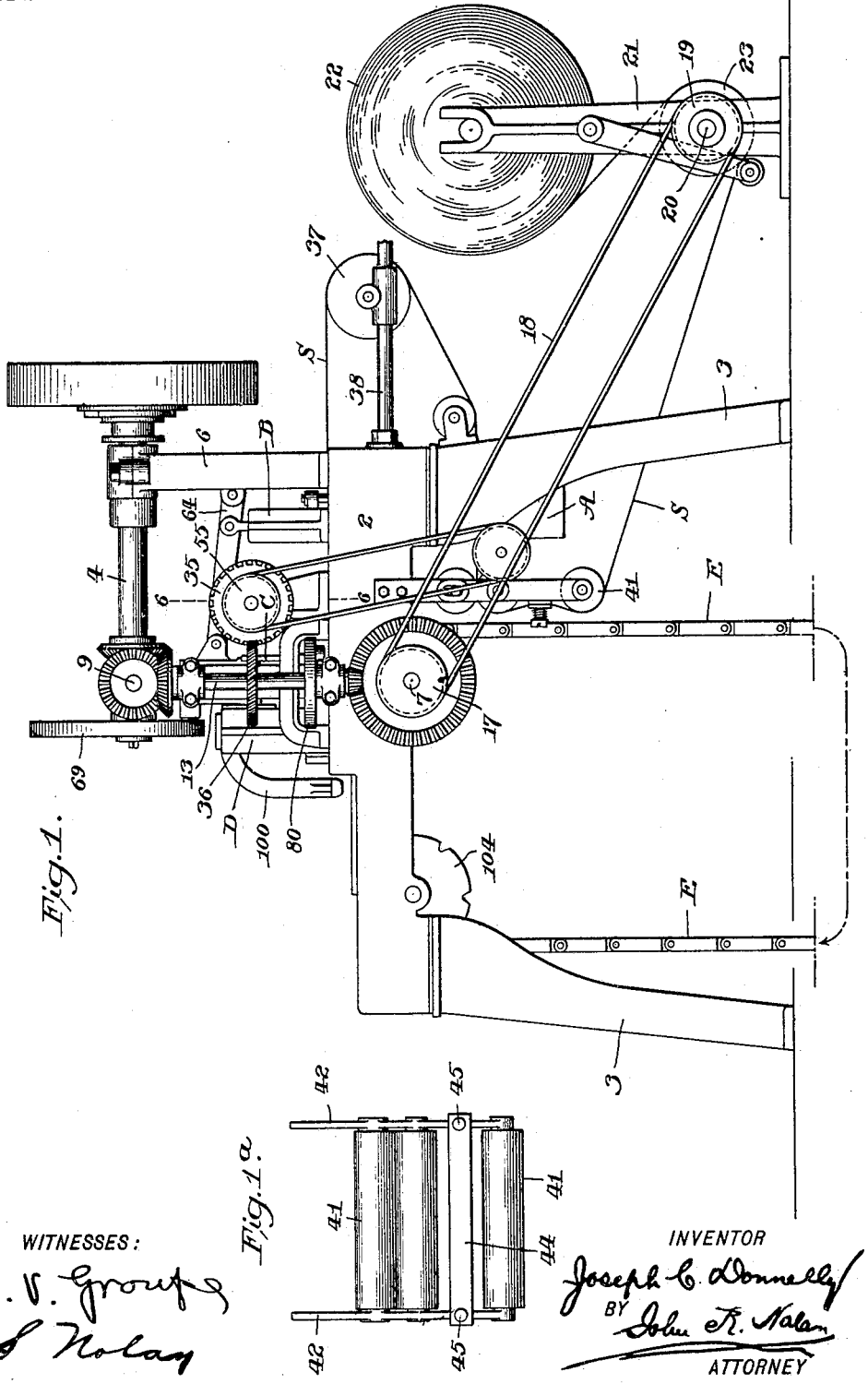
Figure 2:
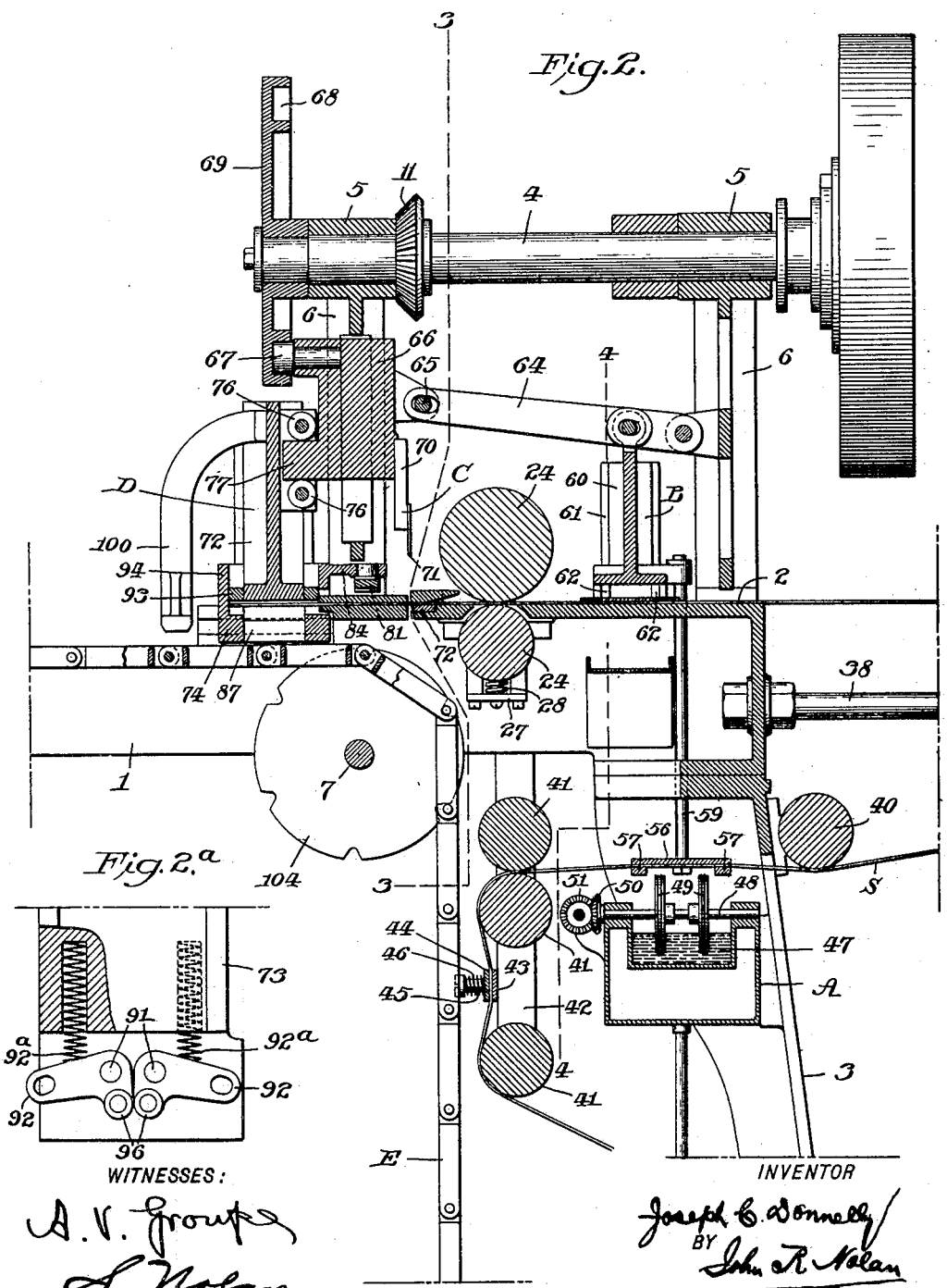
Figure 3:
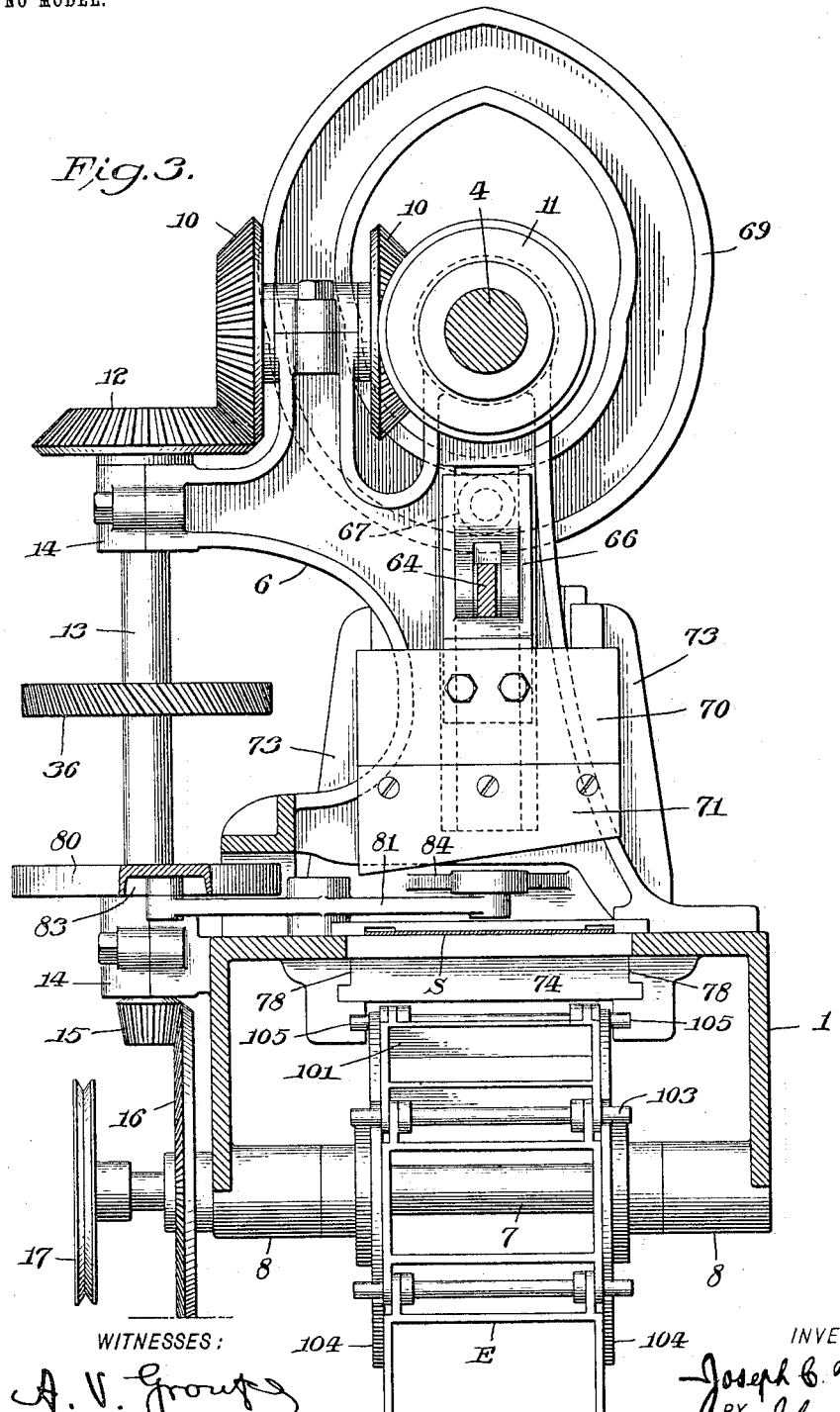
Figure 4:
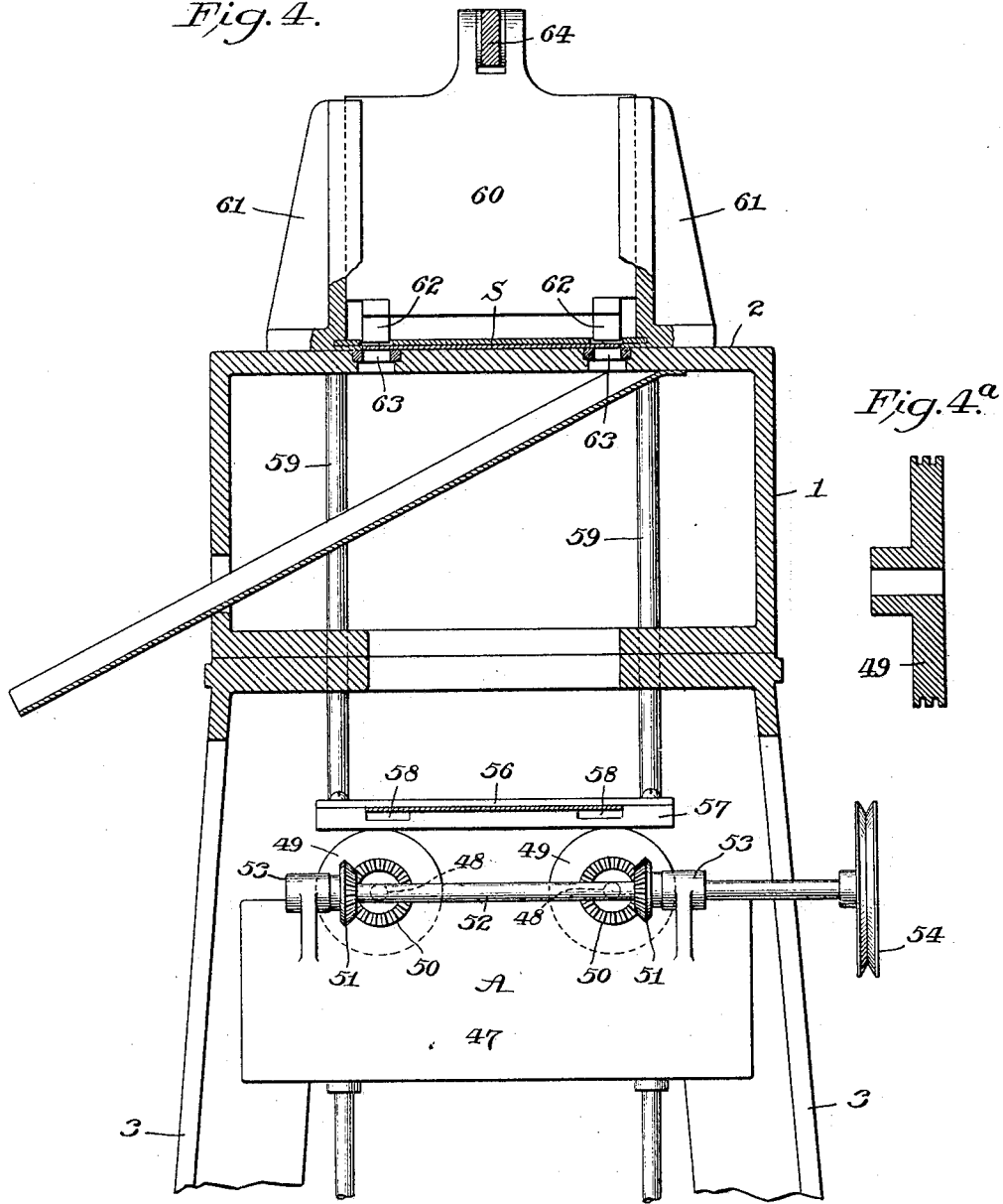
Figure 5:
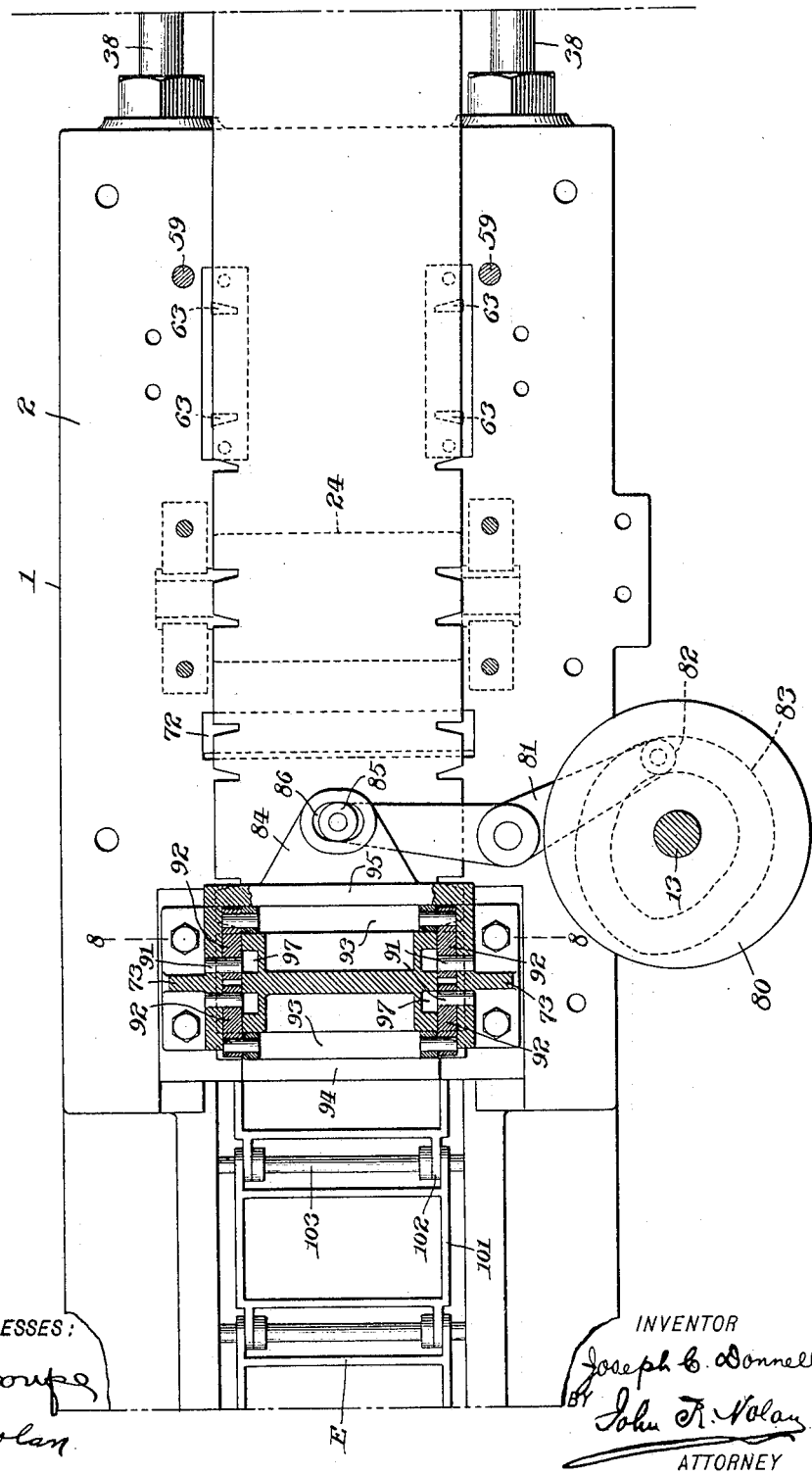
Figure 10:
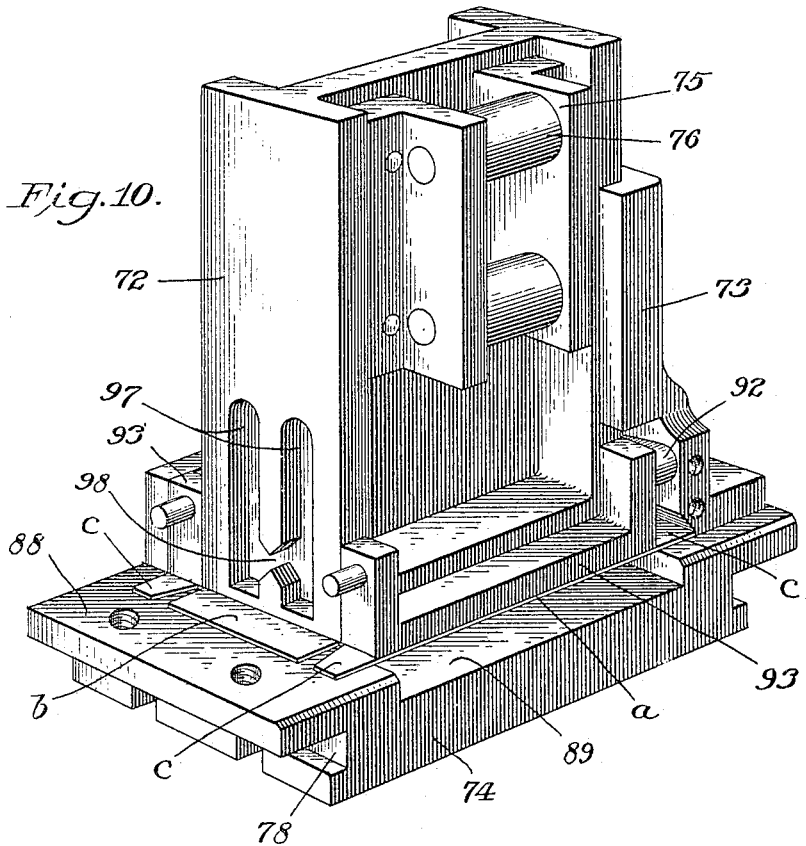
Figure 11:
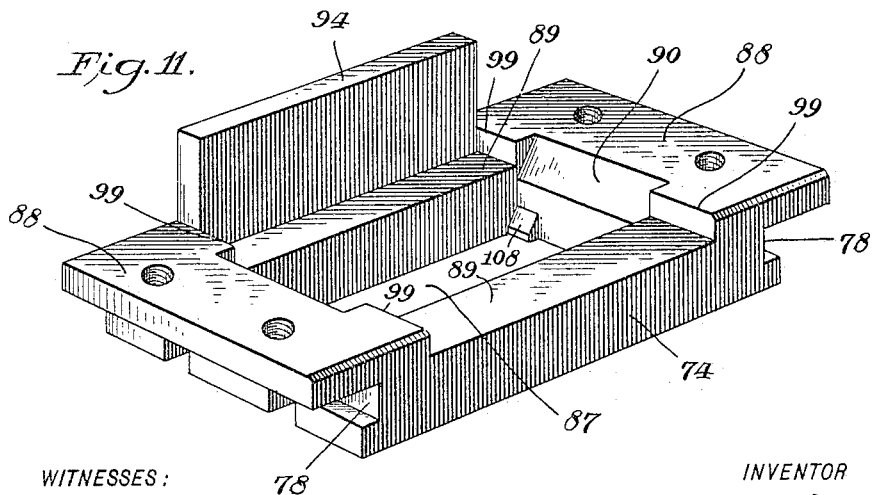

In the drawings, Figure 1 is a side elevation of a box-making machine embodying my invention. Fig. 1ª is a detail of guide-rollers and tension device for the strip from which the trays are produced. Fig. 2 is a longitudinal vertical section, enlarged, through the body of the machine. Fig. 2ª is a sectional detail of the tray-forming mechanism. Fig. 3 is a transverse vertical section as on the line 3 3 of Fig. 2. Fig. 4 is a similar section as on the line 4 4 of Fig. 2. Fig. 4ª is a section of one of the glue-feeding disks. Fig. 5 is a plan of the bed of the machine, showing the tray-forming mechanism partly in section, a portion of the chain or carrier, the strip of material, and other parts. Fig. 6 is a sectional detail of the feed-roller mechanism as on the line 6 6 of Fig. 1. Fig. 7 is a similar detail as on the line 7 7 of Fig. 6. Fig. 8 is a vertical section through the tray-forming mechanism as on the line 8 8 of Fig. 5. Fig. 9 is a sectional detail of a side of the matrix-carriage. Fig. 10 is a perspective view of the said carriage, its coöperating plunger, and adjuncts. Fig. 11 is a similar view of the carriage detached. Figs. 12, 13, 14, and 15 are vertical sections through the matrix-carriage, the plunger, and adjuncts of the tray-forming mechanism, showing the parts in the several positions which they are successively caused to assume during the formation of the tray. Fig. 16 is a perspective view of the completed tray.

1 designates a substantial supporting-frame comprising the bed-plate 2 and standards 3.

4 is the main shaft, having its bearings in boxes 5, supported by standards 6 on the bed-plate, and 7 is a counter-shaft journaled in boxes 8 beneath the bed-plate and geared with the main shaft. In the present instance the gearing comprises a horizontal stud-shaft 9, borne in one of the standards 6 and provided at its respective ends with bevel-wheels 10, one of which gears with a bevel-wheel 11 on the main shaft and the other of which gears with a similar wheel 12 on a vertical shaft 13, mounted in suitable bearings 14 laterally of the bed-plate. On the lower end of the vertical shaft is a bevel-pinion 15, in gear with a bevel spur-wheel 16 on the counter-shaft. One end of the latter shaft bears a pulley 17, which is connected, by means of a belt 18, with a similar pulley 19, the shaft 20 of which is journaled in a pedestal 21, arranged in rear of the main frame. On this pedestal is supported a roll 22 of stout paper, strawboard, or other suitable material, from which the trays are formed. The strip S is drawn from this roll down around a roller 23 on the shaft 20, which roller being positively driven insures the unwinding of the strip from the roll. The strip extending from the roll is passed across a glue-applying mechanism A beneath the bed-plate and then upon and along the top of such plate in position to be progressively operated upon at prescribed stages—first, by punching mechanism B, which cuts the notches in the edges of the strip; second, by a cutter C, which severs the strip into blanks of proper length, and, third, by a forming mechanism D, which turns up the sides and ends of the successive blanks, introduces trays thus formed to a continuously-moving endless carrier E, and finally discharges the completed trays from said carrier, all of which will be hereinafter particularly described in their order of operation.

The strip is intermittently impelled by the action thereon of a pair of feed-rollers 24, through the bite of which the strip extends. These rollers are conveniently arranged between the punching and cutting mechanisms. The shaft 25 of the lower roller is journaled in boxes 26, which are slidingly fitted to depending brackets 27 on the under side of the bed-plate and are maintained yieldingly elevated by the action of springs 28, which are suitably disposed within the brackets, the bed-plate being transversely slotted for the passage of such lower roller. The shaft 29 of the upper roller is journaled in bearings 30, rising from the bed-plate, and mechanism is provided for intermittently rotating said shaft. In the present instance this mechanism includes an ordinary Geneva stop-movement, whereof the radially-recessed disk member 31 is fast on one end of the roller-shaft 29, while the coacting crank member 32 is carried by a short upper shaft 33, having its bearings in post 34 on the bed-plate. On the outer end of the shaft 33, is a spiral gear 35, with which a similar gear 36 on the vertical shaft 13 coacts, and thereby transmits motion to the stop-movement.

A roller 37, supported by rearwardly-extending arms 38 on the bed-plate, and rollers 40 41, mounted in suitable supports at the front and rear, respectively, of the glue-applying mechanism, guide the strip in its traverse to and across the latter and about the rearward end of the bed-plate.

The supports for the roller 41 comprise a pair of arms or hangers 42, depending from the bed-plate. These arms or hangers are connected by a cross-bar 43, against the face of which is yieldingly held a pressure-bar 44, said latter bar being loosely supported at its ends on pins 45, which are encircled by springs 46, that act against the pressure-bar. The strip passes between the two bars, and thus the requisite tension is applied to the strip.

The glue-applying mechanism A includes in its construction a steam-jacketed vessel 47, in which the liquid glue is contained. Supported in bearings in the sides of this vessel, near the respective ends thereof, are two parallel shafts 48, each of which is provided with a pair of suitably-spaced peripherally-grooved disks 49, the peripheries of which revolve in the liquid within the tank. Each of the shafts 48 is provided at one end with a bevel-wheel 50, which gears with a similar wheel 51 on a shaft 52, having its bearings in brackets 53 exteriorly of the vessel and being provided with a sheave 54, which is belted with a sheave 55 on the end of the shaft 33. Thus the shafts 48 are continuously driven, and the disks thereon are simultaneously revolved within the vessel. Arranged immediately above the vessel is a horizontal guide-frame, through which the strip extends in its passage above the vessel. This frame is raised and lowered at predetermined intervals in a manner to present prescribed portions of the strip to the peripheries of the revolving disks, and thereby insure the application of glue to such portions. The peripheral grooves in the disks divide the glue, and thereby effect an equal distribution of the same on the parts of the strip brought into contact with said disks. In the present instance the frame comprises a plate 56, provided on its under side at its respective lateral edges with cross-bars 57, the upper faces of which are recessed to afford spaces for the passage of the strip. The ends of the spaces are offset, as at 58, to permit the passage of the edges of the strip without any liability of the rubbing or scraping of the glue that has been applied thereto. Rising from the frame are two rods 59, which are connected with the reciprocating head 60 of the punching mechanism B, and thereby actuated. This head is slidingly fitted to vertical guideways in posts 61 on the bed-plate, and it is provided on its under side at its respective corners with appropriate male dies 62, which coact with complementary dies 63 on the plate. The strip passes between the coacting dies, as usual, and the upper dies at predetermined intervals are caused to descend upon and notch out the edges of the strip. The punch-head 60 is connected to a lever 64, which is fulcrumed at one end to the rearward standard 6, the opposite end of the lever having a pin-and-slot connection 65 with a vertically-movable cross-head 66, mounted in guideways on the forward standard 6. The cross-head is provided with a lateral stud (or roller) 67, which runs in the groove 68 of a face-cam 69 on the end of the main shaft, the contour of the cam-groove being such as to effect periodical reciprocations of the cross-head. Consequently the lever 64 is operated concurrently with the cross-head, and the punch-head is correspondingly actuated. On the inner face of the cross-head is bolted a plate 70, carrying a depending cutter-blade 71, which in the descent of the cross-head coacts with a fixed shearing-bar 72 on the bed-plate, and thereby severs the opposing portion of the strip transversely. The bed-plate is of course provided with a suitable slot for the passage of the descending knife. The operation of the cutter is timed to sever the strip into succeeding blank lengths, whereof the edges are appropriately notched near their respective ends.

The blanks as they are severed from the strip are advanced to the forming mechanism D by the opposing end of the forwardly-moving strip, and thereupon the edges and ends of the blanks are appropriately turned to form the sides and ends of the tray.

The tray-forming mechanism includes in its construction a vertically-reciprocative plunger 72, which is arranged immediately in front of the cross-head 66. This plunger is mounted to slide in vertical guideways in posts 73, rising from a horizontally-movable matrix-carriage 74 on the bed-plate. On the side of the plunger adjacent the cross-head is a pair of brackets 75, in which are journaled the shafts or trunnions of a pair of horizontal rollers 76, which embrace a flange or projection 77 on the cross-head, whereby the plunger is reciprocated by the cross-head and is at the same time horizontally movable in respect to the latter. The carriage is provided at its respective ends with guideways 78, which are slidingly fitted to guide-ribs 79 on the bed-plate. The movement of this carriage is effected by means of a face-cam 80 on the vertical shaft 13 in conjunction with a lever 81, which is fulcrumed on the bed-plate, one arm of the lever being provided with a a roller 82, adapted to the cam-groove 83, and the other arm thereof having a loose connection with a rearwardly-extending lug 84 on the carriage. This connection in the present instance comprises a roller 85 on the lever and a slot 86 therefor in the lug. The vertically-reciprocating plunger 72 obviously partakes of the horizontal motion of the carriage. This compound movement of the plunger is designed to insure its timely operation in respect to the underlying continuously-moving carrier E, as will presently appear. The lower end of the plunger corresponds in shape and size with the bottom of the tray to be formed and is movable up and down in an appropriate opening or matrix 87 in the carriage. The upper surface 88 of the carriage is on the same horizontal plane as the top of the bed, so as to receive the tray-blanks as they are successively advanced, and the sides of the carriage adjacent the opening or matrix 87 are offset or depressed to afford horizontal supports 89 below such surface. The ends of this opening or matrix are beveled, as at 90, the lower edges of the bevels being slightly below the level of the bed, as illustrated. (See Fig. 11.)

Pivoted at 91 on the inner side of each of the end posts 73 is a pair of oppositely-extending crank-levers 92, the long arm of which extends outwardly, and are pivotally connected with the adjacent ends of a pair of U-shaped members 93 on the respective sides of the plunger. The forward side of the carriage is provided with an upwardly-extending wall 94, between which and the opposing portion of the plunger is afforded a space for the reception and guidance of one of said members. The other member is guided in a similar space formed between the plunger and a cross-bar 95, connecting the two posts 73. The shorter arms of the crank-levers bear inwardly-extending stud-rollers 96, that register with vertical guide-slots 97 in the sides of the plunger. Bearing upon the longer arms of these levers to maintain them yieldingly depressed are springs $92^a$, contained in sockets in the posts 73. The wall between each pair of slots is interrupted by an opening 98, the upper and lower edges of which are beveled to afford reversely-disposed V-shaped cam-surfaces, as shown.

The parts just described are so arranged in relation to each other that when the plunger 72 is in its elevated position the studs or rollers 96 of the crank-levers lie at the lower ends of their respective guide-slots 97 against the pressure of the springs $92^a$, and the lower surfaces of the members 93 are flush with the bottom of the plunger, or substantially so. (See Fig. 12.) In the initial downward movement of the plunger the said studs or rollers of the crank-levers are caused to enter the cam-opening 98 of the plunger by the action of the springs $92^a$, and hence the longer arms of the levers and the U-shaped members connected therewith are depressed. Consequently the body of the tray-blank upon which the plunger bears is moved down, and the side portions $a$ of such blanks are brought in contact with the supports 89. At the same time the end members $b$ of the blank take against and are caused to assume the outward inclination of the beveled end portions 90 of the matrix, and the corner members $c$ of the blank are turned up at right angles to the side members $a$ by the action thereon of the U-shaped member 93 and the proximate shoulder 99 of the carriage. (See Fig. 13.) The plunger continuing its descent enters the opening of the carriage, and hence the sides $a$ of the blank are turned upward to a vertical position by the action thereagainst of the opposing walls of said opening, and concurrently therewith the corner members containing the adhesive are turned inward. Thereupon the end members $b$ of the blank impinge against the lower corners of the bevel portions of the opening, and are thus pressed to a vertical position against such inwardly-turned corner members. As the descent of the plunger continues the tray thus formed is pressed through the opening 87. The instant the plunger enters the matrix below the surface 89 the cam-opening 98 escapes the rollers 96 and causes the crank-levers, with their connected members 93, to resume their normal condition, so as to allow the sides $a$ to assume the vertical position.

Traveling directly beneath the opening 87 of the carriage as the tray is ejected from the latter is one of the compartments of the continuously-moving carrier E, and hence the tray is pressed into such compartment and carried off thereby. The carrier is of such length that the glued portions of the tray are completely dry before it has made a complete circuit. To effect the discharge of the finished tray from the carrier, the plunger 72 is provided on its forward face with a depending arm 100, which in the descent of the plunger to insert a tray in one of the compartments enters the next rearward compartment of the chain and bears upon the bottom of the tray in the latter compartment. Thus during each downward stroke of the plunger a tray to be dried is inserted in the carrier and a tray which has been dried is discharged from the carrier. The compound movement, hereinbefore mentioned, of the plunger permits the latter and its arm to enter and advance with the continuously-moving compartments of the carrier, then to move outward therefrom, and finally to return for a succeeding operation.

The carrier in its preferred construction comprises an endless chain of open rectangular frames 101, provided with end lugs 102, which are linked together by cross-rods 103. The ends of these rods are extended beyond the frames 101 and are adapted to register with peripheral notches in wheels 104, which are arranged in pairs on suitably-disposed shafts. One of these shafts is the positively-driven counter-shaft 7, hereinbefore described, and hence the carrier is continuously impelled to advance the frames thereof progressively across the path of the plunger. The projecting ends of the rods 103 are conveniently supported and guided in horizontal ways 105, formed in the bed-plate directly below the guide-ribs 79.

I preferably provide in the ends of the matrix-carriage, at the lower portion thereof, spring-controlled latches, which normally project into the opening 87. These latches are caused to recede by the pressure thereagainst of the tray as it is being pushed down through said opening into the carrier E, yet when the tray passes below the latches they move against the opposing portions of the plunger to serve as strippers for the tray during the upward stroke of the plunger. In the present instance the latches comprise socketed blocks 106, arranged in the bottom of the matrix-carriage; stems 107, fitted to slide in said blocks and provided with beveled heads 108, and springs 109, supported in the sockets of the blocks to press against the inner edges of the heads.

The operation of the machine may be briefly described as follows: As the strip of material is drawn from the roll and advanced through the machine the rising and falling frame through which the strip extends presents such strip at intervals to the revolving glue-applying rollers, and at the same time the punches cut the notches in the edges of the strip. The reciprocating cutter in its descent progressively severs the leading end of the strip into blanks of suitable length, and these blanks are successively advanced upon the carriage and beneath the vertically-reciprocating plunger. This plunger in its descent forces the opposing blank into the opening or matrix of the carriage and effects the formation of the tray from the blank. As the plunger continues its descent the tray thus formed is pushed thereby through the said opening or matrix into a compartment of the continuously-moving chain and is held therein until the glued parts of the tray have thoroughly set and dried, whereupon the finished tray, as it approaches the plunger, is discharged from the carrier by the ejecting-arm on the plunger. The horizontally-reciprocating matrix-carriage insures the efficient operation of the plunger and arm with relation to the continuously-moving carrier.

I claim—

1. In a machine for making box-trays, the combination of a reciprocating head, a cutter thereon, notching mechanism including a reciprocating part, a lever connected with said head, a pivotal connection between said lever and said reciprocating part, means for containing and applying adhesive material, a strip-guide directly above said means, and a connection between said guide and lever.

2. In a machine for making box-trays, a blank-support having therein an opening or matrix corresponding in length and width with the tray to be formed, the sides of the support being offset or depressed throughout the length of the opening or matrix, and the ends of such opening or matrix being beveled throughout its width, in combination with a plunger to coact with such opening or matrix, devices to coact with the offsets or depressions in said support, and means for relatively operating said plunger and devices.

3. In a machine for making box-trays, a blank-support having therein an opening or matrix corresponding in length and width with the tray to be formed, the sides of the support being offset throughout the length of the opening or matrix and the ends of such opening or matrix being beveled throughout its width, in combination with a plunger adapted to register with such opening or matrix, side members on said plunger adapted to coact with the offsets or depressions in the said support, and means for operating said plunger and side members.

4. In a machine for making box-trays, a forming mechanism comprising a blank-support having a matrix therein, with depressed side portions, a plunger coacting with said matrix, means for operating said plunger, side members on said plunger reciprocable in parallelism with and independently of the plunger and arranged directly above such depressed portions so as to be movable into and from the same, and means for actuating said members.

5. In a machine for making box-trays, a forming mechanism comprising a blank-support having a matrix therein with depressed side portions, a plunger coacting with said matrix, means for operating said plunger, side members on said plunger, reciprocable in parallelism with and independently of the plunger, and arranged directly above such depressed portions so as to be movable into and from the same, levers, fulcrum-supports therefor, connections between said levers and the side members, and cam connections between said levers and the plunger.

6. In a machine for making box-trays, a forming mechanism comprising a blank-support having a matrix therein with beveled end portions and depressed side portions, a plunger coacting with said matrix, means for operating said plunger, side members on said plunger reciprocable in parallelism with and independently of the plunger and arranged directly above such depressed portions so as to be movable into and from the same, and means for actuating said members.

7. In a machine for making box-trays, a forming mechanism comprising a blank-support having a matrix therein with beveled end portions and depressed side portions, a plunger coacting with said matrix, and having lateral guide-slots with cam portions, means for operating said plunger, side members movable into and from the said side portions, crank-levers, fulcrum-supports therefor, connections between said levers and the side members, and connections between said levers and the guide-slots of the plunger.

8. In a machine for making box-trays, the combination with tray-forming mechanism, of a tray-carrier, including tray-receiving compartments, movable adjacent the discharging portion of said mechanism, means for continuously moving said carrier, and means for moving said mechanism in the direction of motion of the carrier and back again.

9. In a machine for making box-trays, the combination with tray-forming mechanism, of a carrier, including tray-receiving compartments, movable adjacent the discharging portion of said mechanism, means for actuating said carrier to bring the compartments thereof successively into position to receive the trays discharged from the said mechanism, and means for ejecting the trays from said compartments.

10. In a machine for making box-trays, the combination with tray-forming mechanism, of a carrier, including tray-receiving compartments, movable adjacent the discharging portion of said mechanism, means for continuously moving said carrier to advance its compartments successively into position to receive trays discharged from said mechanism, mechanism for ejecting the trays from said compartments, and means for moving the tray-forming and tray-ejecting mechanisms in the direction of motion of the carrier and back again.

11. In a machine for making box-trays, the combination with a vertically-reciprocating member, a tray-forming mechanism including a plunger having a horizontally-movable connection with said member, a matrix-carriage with which said plunger coacts, guides on said carriage for the plunger, and means for horizontally reciprocating said carriage, of a carrier, including tray-receiving compartments, movable below said carriage, and means for continuously moving said carrier.

12. In a machine for making box-trays, the combination with a vertically-reciprocating member, a tray-forming mechanism, including a plunger having a horizontally-movable connection with said member, a matrix-carriage with which said plunger coacts, guides on said carriage for the plunger, and means for horizontally reciprocating said carriage, of a carrier, including tray-receiving compartments movable below said carriage, and means for continuously moving said carrier, together with an arm on said plunger adapted to eject trays from the carrier.

13. In a machine for making box-trays, the combination with a source of strip-supply, and feed mechanism therefor, of means for applying adhesive material to said strip, notching and forming mechanisms, a reciprocating head, a cutter thereon, a connection between said head and the forming mechanism, a connection between said head and the notching mechanism, a connection between the notching mechanism and the means for applying adhesive material, a shaft, a cam thereon, and a connection between said cam and the reciprocating head.

In testimony whereof I have hereunto affixed my signature in the presence of two subscribing witnesses.

JOSEPH C. DONNELLY.

Witnesses:
ANDREW V. GROUPE,
JOHN R. NOLAN.